United States Patent
Lan

(10) Patent No.: US 6,848,697 B2
(45) Date of Patent: Feb. 1, 2005

(54) FOLDABLE AND POSITIONING DEVICE OF SCOOTER CONTROLLED BY DRIVER'S LEG

(76) Inventor: May-Chu Lan, 235 Chung-Ho Box 8-24, Taipei (TW)

( * ) Notice: Subject to any disclaimer, the term of this patent is extended or adjusted under 35 U.S.C. 154(b) by 75 days.

(21) Appl. No.: 10/150,870

(22) Filed: May 20, 2002

(65) Prior Publication Data

US 2003/0214108 A1 Nov. 20, 2003

(51) Int. Cl.⁷ .................................................. B62M 1/00
(52) U.S. Cl. ................................................... 280/87.05
(58) Field of Search .................. 230/87.01, 87.021, 230/87.041, 87.042, 87.05, 842

(56) References Cited

U.S. PATENT DOCUMENTS

| 1,075,250 | A | * | 10/1913 | Gingold | 280/87.041 |
| 1,530,165 | A | * | 3/1925 | Fowler | 280/87.042 |
| 2,546,711 | A | * | 3/1951 | Amendt | 280/87.05 |
| 4,707,884 | A | * | 11/1987 | Chang | 16/440 |
| 6,120,044 | A | * | 9/2000 | Tsai | 280/87.05 |
| 6,367,829 | B1 | * | 4/2002 | Lee | 280/87.05 |
| 6,428,021 | B1 | * | 8/2002 | Tung | 280/87.041 |
| 6,443,470 | B1 | * | 9/2002 | Ulrich et al. | 280/87.041 |
| 6,450,517 | B1 | * | 9/2002 | Lee | 280/87.041 |
| 6,491,312 | B2 | * | 12/2002 | Reynolds et al. | 280/87.041 |

FOREIGN PATENT DOCUMENTS

| GB | 167322 | * | 8/1921 | 280/87.05 |
| GB | 264987 | * | 2/1927 | 280/87.05 |

* cited by examiner

*Primary Examiner*—Frank Vanaman

(57) ABSTRACT

A foldable and positioning device of a scooter controlled by a leg of a driver comprises: a support frame having two positioning plates; a connecting seat positioned at a front end of the scooter body; two pedals; and a spring installed between one post and a rotary shaft. An upper side of the connecting seat has two lateral walls; and each wall has a hole. Each post is capable of engaging a groove of one positioning palate to one respective hole. When a user treads one ear of a pedal, the support frame is folded. When another one of the grooves is aligned with the hole, the post will automatically move into the hole and the groove. Thereby, the support frame is folded and positioned above the scooter body.

2 Claims, 6 Drawing Sheets

FOLDABLE AND POSITIONING DEVICE OF SCOOTER CONTROLLED BY DRIVER'S LEG

FIELD OF THE INVENTION

The present invention relates to scooters; and particularly to a foldable and positioning device of a scooter controlled by a leg of a driver.

BACKGROUND OF THE INVENTION

Referring to FIGS. 1 and 1A, a prior art folding structure of a scooter is illustrated, the folding structure is disclosed by the Applicant of the present invention and is filed with a Taiwan Patent No. 89207153. In the prior art, one end of the linkage A is formed with a long hole and a round hole. A quick detaching means B passes through the long hole and one axial rod C passes through the round hole so that the linkage is pivotally connected to the folding means D. Thereby, the linkage A can be folded around the axial rod C by rotating within the folding means D. A stud is buckled into receiving grooves at top sides of a buckling block E extending upwards from the folding means. The quick detaching means B serves to engage the buckling block E with the linkage A. In this prior art, since the engagement of the quick detaching means B is not a preferred way and thus it will wear rapidly. Thereby, the linkage A and the folding means D can not be engaged with a preferred way. Moreover, if the user applies an improper force to the quick detaching means or makes a mistake as the user operates the quick detaching means, it will affect the safety of the driver. If it is desired to rotate the linkage A, a force must be applied to the stud of the quick detaching unit B so that the stud will release from the confinement of the buckling block E. Since the elastic force of the spring is very strong, the user must move the spring and then lifts the spring upwards. However, this operation is inconvenient.

SUMMARY OF THE INVENTION

Accordingly, the primary object of the present invention is to provide a foldable and positioning device of a scooter controlled by a leg of a driver, wherein the scooter can be folded by treading a pedal, or the scooter body can be unfolded for being driven.

Another object of the present invention is to provide a foldable and positioning device of a scooter controlled by a leg of a driver; wherein the device has two grooves and a hole. A post is used to engage the groove and the hole so as to adjust the position relation of a support frame and the scooter body.

In order to achieve above mentioned object, the present invention provides foldable and positioning device of a scooter controlled by a leg of a driver comprising a support frame having two positioning plates; a connecting seat positioned at a front end of a scooter body; two pedals; and a spring. An upper side of the connecting seat has two lateral walls; and each wall has a hole. A post passes through a respective hole and a groove of a positioning plate. When a user treads one ear of a pedal to drive the pedal; then the support frame is folded and another one of the grooves is aligned to the hole, the post will automatically move into the hole and the groove. Thereby, the support frame is folded and positioned above the scooter body. As the operation process is reversed, than the support frame stands upright and thus the scooter can be driven.

The various objects and advantages of the present invention will be more readily understood from the following detailed description when read in conjunction with the appended drawing.

DETAILED DESCRIPTION OF THE PREFERRED EMBODIMENTS

Figure 1:
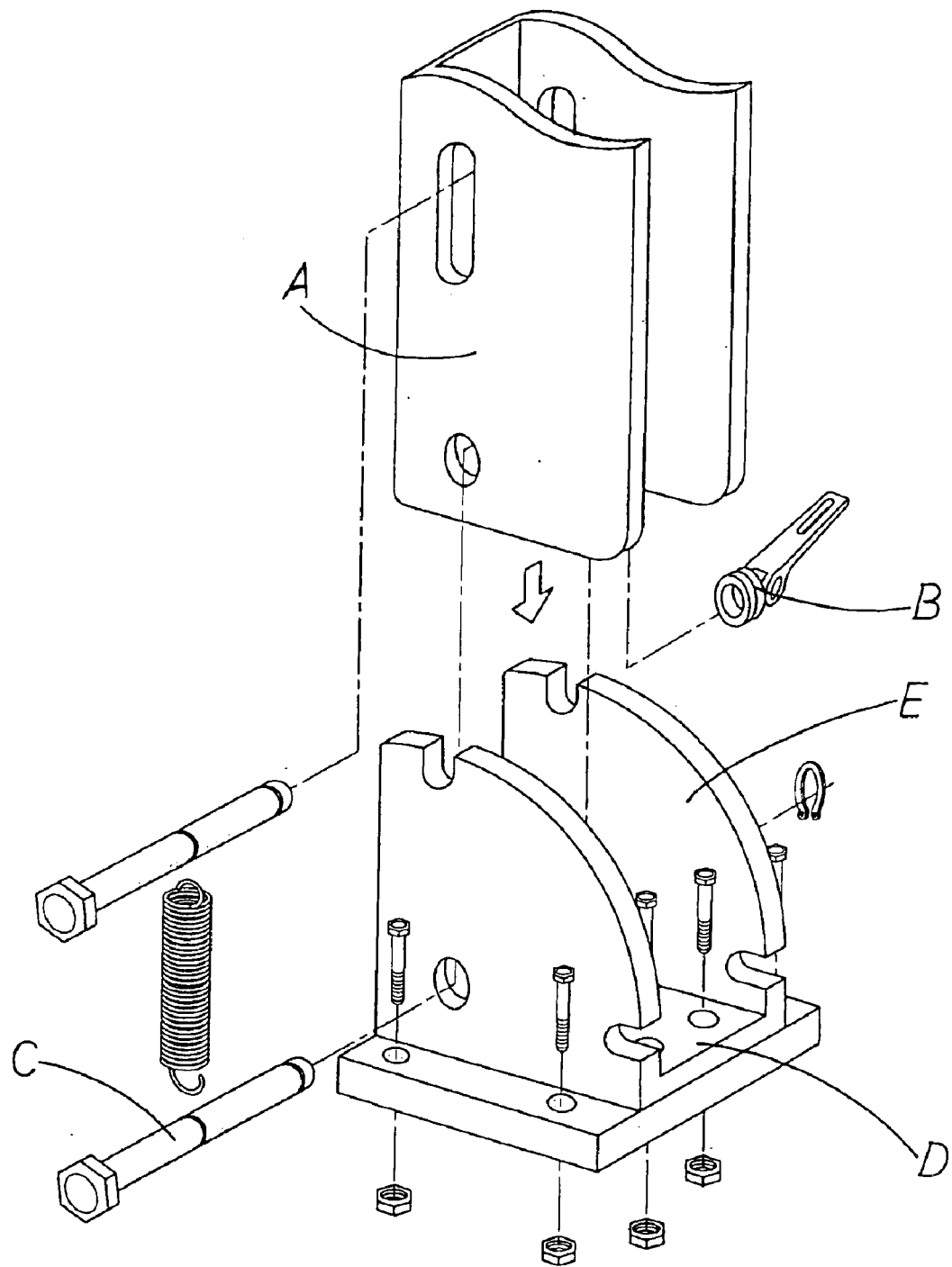
FIG. 1 is an exploded perspective view of a prior art.
Figure 1A:
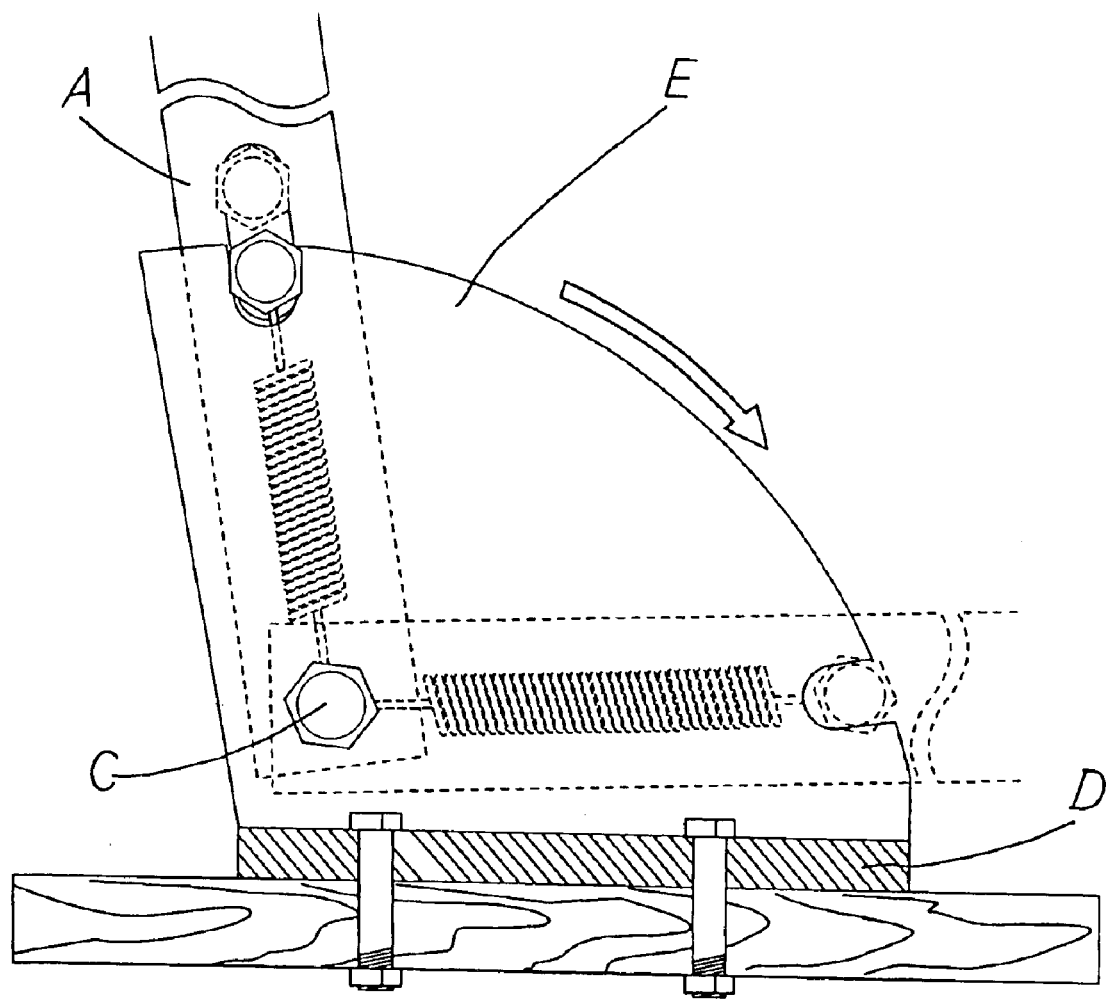
FIG. 1A shows the folding operation of the prior art.
Figure 2:
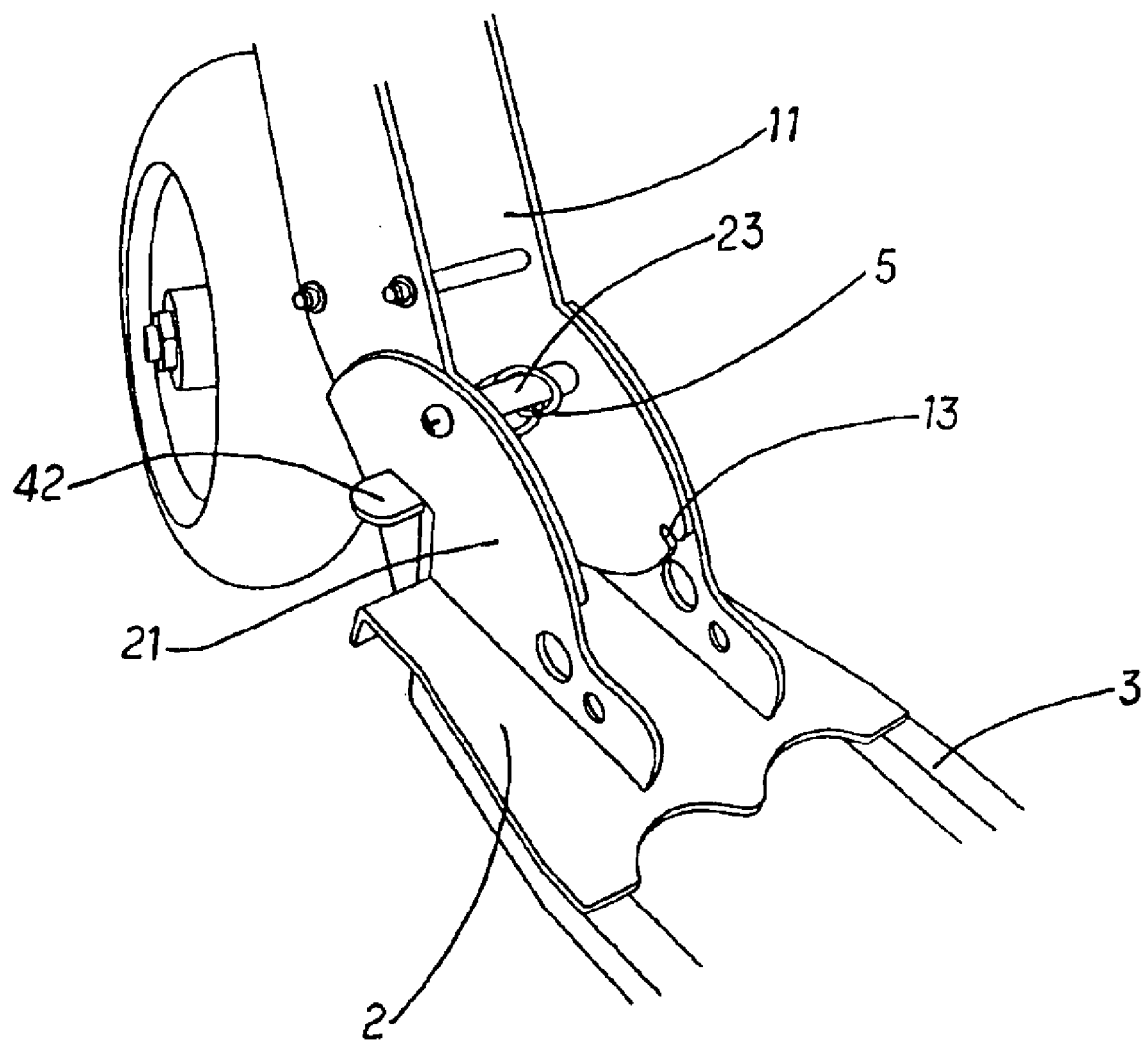
FIG. 2 is an assembled perspective view of the present invention.
Figure 3:
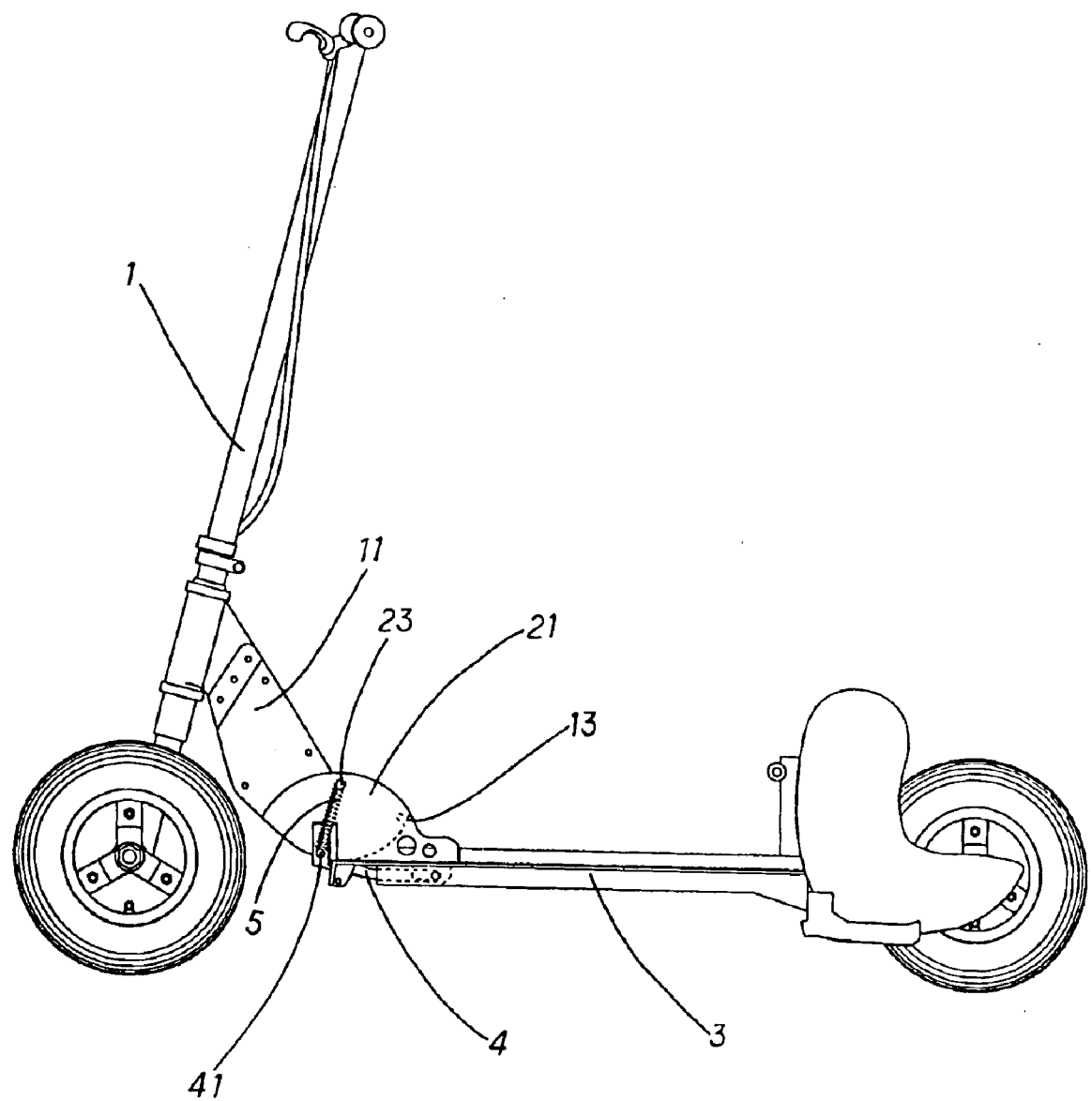
FIG. 3 is a lateral view of the present invention.
Figure 4:
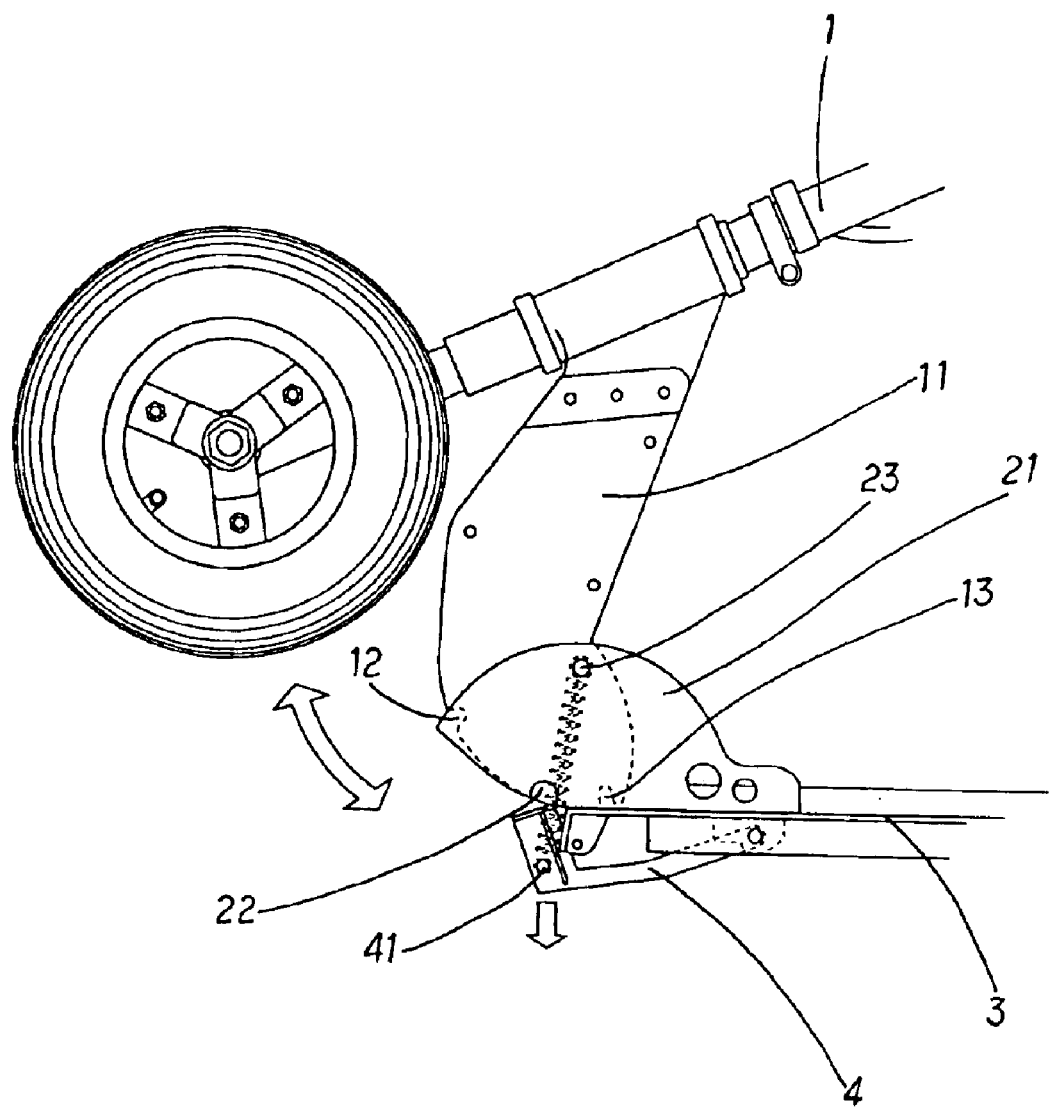
FIG. 4 is a schematic view showing the folding status of the present invention.
Figure 5:
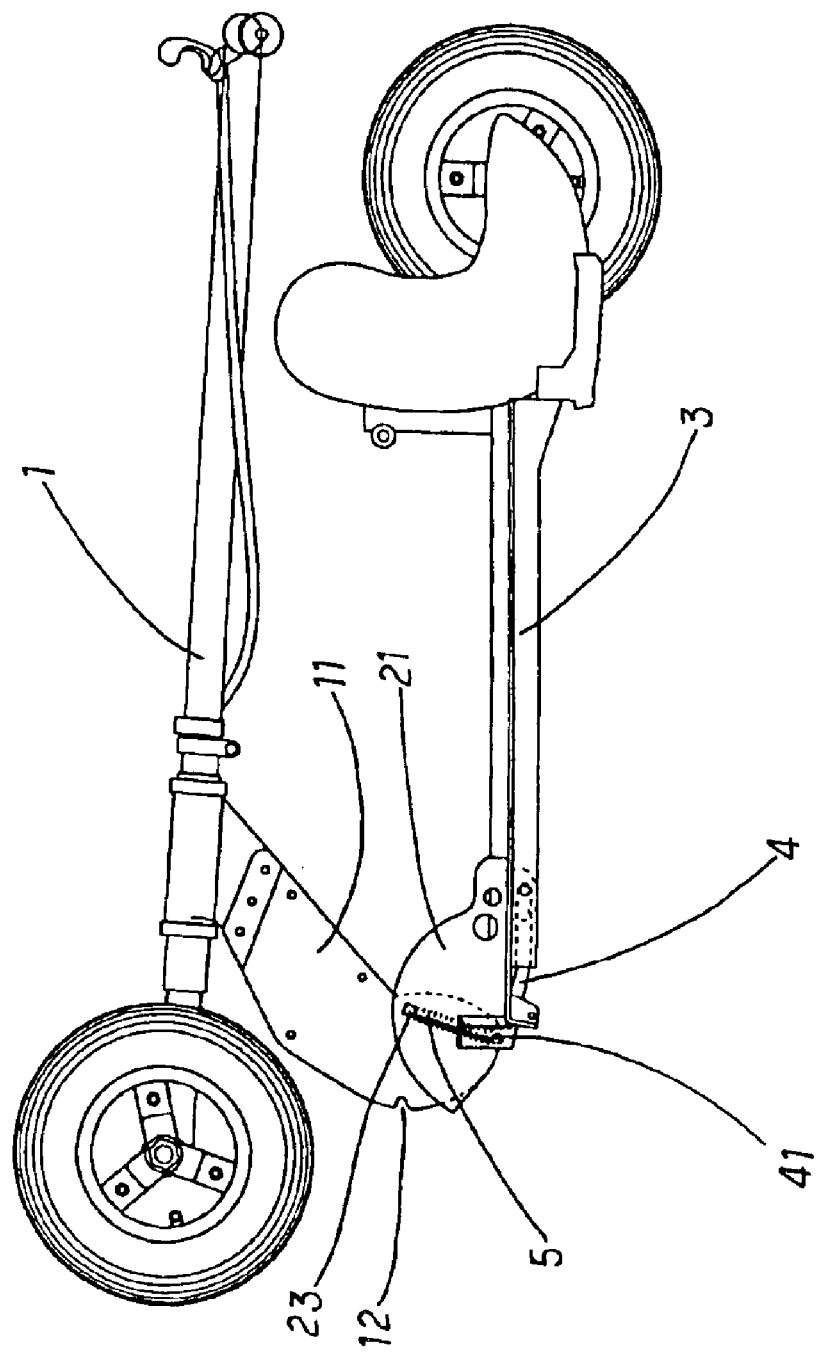
FIG. 5 is a schematic view showing that the folding operation of the scooter of the present invention has been completed.

Referring to FIGS. 2 and 3, the foldable and positioning device of a scooter controlled by a leg of a driver of the present invention is illustrated. In the present invention, two positioning plates 11 extend from a lower end of the support frame 1. A lower edge of the positioning plate 11 is a cambered or a curved surface and has two grooves 12, 13 (also see FIG. 4). A connecting seat 2 is positioned at a front end of a scooter body 3. An upper side of the connecting seat 2 has two lateral walls 21. A lower end of each wall 21 has a hole 22. The positioning plates 11 are installed at the inner surfaces of the lateral walls 21. A rotary shaft 23 serves to position the positioning plates 11 so that the grooves 12 and 13 can be driven to a position for being engaged with the hole 22. A rear side of a pedal 4 is installed to a bottom of a front edge of the scooter body 3. A front end of each pedal 4 has a post 41. An ear 42 is installed at one lateral side of each post 41. As required, each post 42 can be engaged with the hole 22 at the lower end of the lateral wall 21 and one of the grooves 12, 13 of the positioning plate 11. A spring 5 having a strong elastic force is installed between a respective post 41 and the rotary shaft 23. Thereby, the user can tread the ear 42 to drive the pedal 4 and cause the post 41 to release from the confinement of the hole 22 and the groove 12 or 13 (referring to FIG. 4). Then the support frame 1 is folded. Since the post 41 is affected by the spring 5, the movement length of the positioning plate 11 is prolonged. When another one of the groove 13 or 12 is aligned to the hole 22, the resisting post 41 will automatically move into the hole 22 and the groove 13 or 12. Thereby, the support frame 1 is folded and positioned above the scooter body 3 (referring to FIG. 5), or the support frame 1 stands upright for being driven.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A foldable and positioning device of a scooter controlled by a leg of a driver comprising:

a support frame, two positioning plates extending from a lower end of the support frame; and a lower edge of each positioning plate being a curved surface; the surface having two grooves;

a connecting seat being positioned at a front end of a scooter body; an upper side of the connecting seat having two lateral walls; a lower end of each wall having a hole; wherein each of the positioning plates being installed at an inner surface of a respective one of the lateral walls; a rotary shaft serving to position the positioning plates to the lateral walls;

two pedals; a rear side of each pedal being installed to a bottom of a front edge of the scooter body; a front end of each pedal having a post; an ear being installed at one lateral side of each post; and a spring being installed between one of the posts and the rotary shaft;

wherein each post is capable of being engaged with the hole at the lower end of one of a respective one of the lateral walls and one of the two grooves of a respective one of the positioning plates.

2. A foldable and positioning device of a scooter controlled by a leg of a driver as claimed in claim 1, wherein a lower side of each positioning plate has a cambered surface and the two grooves are formed on one edge of the cambered surface.

* * * * *